(12) United States Patent
Charlot et al.

(10) Patent No.: US 9,418,150 B2
(45) Date of Patent: Aug. 16, 2016

(54) SYSTEM AND PROCESS FOR CONCEPT TAGGING AND CONTENT RETRIEVAL

(75) Inventors: Regis Charlot, Lake Bluff, IL (US); Frank Naeymi-Rad, Libertyville, IL (US); Alina Oganesova, Chicago, IL (US); Andre Young, Kenosha, WI (US); Andrei Naeymi-Rad, Lake Bluff, IL (US); Aziz Bodal, Arlington Heights, IL (US); David Haines, Arlington Heights, IL (US); Jose Maldonado, Chicago, IL (US); Masayo Kobashi, Long Grove, IL (US); Stephanie Schaefer, Gurnee, IL (US)

(73) Assignee: Intelligent Medical Objects, Inc., Northbrook, IL (US)

( * ) Notice: Subject to any disclaimer, the term of this patent is extended or adjusted under 35 U.S.C. 154(b) by 0 days.

(21) Appl. No.: 13/004,128

(22) Filed: Jan. 11, 2011

(65) Prior Publication Data

US 2012/0179696 A1     Jul. 12, 2012

(51) Int. Cl.
*G06F 17/30* (2006.01)
*G06F 7/00* (2006.01)

(52) U.S. Cl.
CPC ................................ *G06F 17/30731* (2013.01)

(58) Field of Classification Search
None
See application file for complete search history.

(56) References Cited

U.S. PATENT DOCUMENTS

| 5,799,268 | A | * | 8/1998 | Boguraev ......................... 704/9 |
| 5,930,788 | A | * | 7/1999 | Wical |
| 6,055,540 | A | * | 4/2000 | Snow et al. |
| 6,101,515 | A | * | 8/2000 | Wical et al. .................... 715/234 |
| 6,904,432 | B2 | | 6/2005 | Charlot et al. |
| 7,167,858 | B2 | | 1/2007 | Naeymi-Rad et al. |
| 7,496,593 | B2 | | 2/2009 | Gardner et al. |
| 7,536,387 | B2 | | 5/2009 | Charlot et al. |
| 7,693,917 | B2 | | 4/2010 | Charlot et al. |
| 7,711,671 | B2 | | 5/2010 | Meyers |
| 7,870,117 | B1 | | 1/2011 | Rennison |
| 2002/0128861 | A1 | | 9/2002 | Lau et al. |
| 2003/0179228 | A1 | * | 9/2003 | Schreiber et al. ............. 345/738 |
| 2005/0240572 | A1 | * | 10/2005 | Sung et al. ........................ 707/3 |
| 2006/0047632 | A1 | * | 3/2006 | Zhang ............... G06F 17/30734 |
| 2006/0069677 | A1 | * | 3/2006 | Tanigawa et al. .................. 707/4 |

(Continued)

OTHER PUBLICATIONS

VirginiaTech SNOMED Core Structures 2nd AAHA Software Vendors Summit, Apr. 21, 2009.*

(Continued)

*Primary Examiner* — Usmaan Saeed
*Assistant Examiner* — Yu Zhao
(74) *Attorney, Agent, or Firm* — Beem Patent Law Firm

(57) ABSTRACT

A system and process for tagging electronic documents or other electronic content with concepts mentioned, contained, or otherwise described in that content. Once tagged, the content may be searchable, indexable, and retrievable in order to provide that content to an end user or another recipient. The system may be configured to handle a considerable number of asset files and a large number of users, workflows, and access applications simultaneously. The system may auto-tag the content and also may include a user interface for confirming and updating those tags and for manually creating new or additional tags. Content may include documents such as medical documents relating to procedures, diagnoses, medications or other domains. Alternatively, the content may include information about various care providers, in order to allow a user to locate a physician meeting one or more desired criteria.

21 Claims, 13 Drawing Sheets

(56) References Cited

U.S. PATENT DOCUMENTS

| | | | |
|---|---|---|---|
| 2007/0179776 A1* | 8/2007 | Segond et al. | 704/9 |
| 2008/0065452 A1 | 3/2008 | Naeymi-Rad et al. | |
| 2008/0104032 A1* | 5/2008 | Sarkar | 707/3 |
| 2008/0306926 A1 | 12/2008 | Friedlander et al. | |
| 2009/0083231 A1* | 3/2009 | Eberholst et al. | 707/3 |
| 2009/0254572 A1 | 10/2009 | Redlich et al. | |
| 2010/0169299 A1* | 7/2010 | Pollara | 707/708 |
| 2010/0262659 A1 | 10/2010 | Christiansen et al. | |
| 2011/0066425 A1 | 3/2011 | Hudgins et al. | |
| 2011/0138050 A1 | 6/2011 | Dawson et al. | |
| 2011/0184960 A1 | 7/2011 | Delpha et al. | |

OTHER PUBLICATIONS

"Semantic Web: Asking the Right Questions", Duch et al., Seventh International Conference on Information and Management Sciences, Urumchi, China, Aug. 12-19, 2008 entire document www.fizyka.umk.pl/ftp/pub/papers/kmk/08-SemWeb.pdf.

"Social tagging overview (SharePoint Server 2010)" May 12, 2010 entire document http://technet.microsoft.com/en-us/library/ff608137.aspx.

International Search Report and Written Opinion dated May 4, 2012, issued in International Application No. PCT/US2012/20592 (8 pages).

* cited by examiner

- Patients who have difficulty transferring food from the mouth to the pharynx will often reposition their body to optimize alignment of the bolus for presentation to the pharynx . (eso_dis /9905 Pathogenesis and clinical manifestations of ▇▇▇▇ oropharyngeal dysphagia See "Pathogenesis and clinical manifestations of ▇▇▇▇ oropharyngeal dysphagia ", section on Physiology of swallowing ). Such patients may report extending their arms and neck during swallowing , and will often use their finger to move food into proper position .
- A history of ▇▇▇▇ dry mouth or eyes may indicate inadequate salivary production . In such cases it is particularly important to obtain a detailed review of medications . Anticholinergics , antihistamines , and certain antihypertensive agents can reduce salivary flow . Sj gren's ▇▇▇ syndrome is also a consideration . (othrheum /3025 Classification and diagnosis of Sj gren's ▇▇▇ syndrome See "Classification and diagnosis of Sj gren's ▇▇▇ syndrome ").

FIG. 7

| Document Lexicals | | | |
|---|---|---|---|
| Lexicals | Content Portions | Words | Weighted Lexicals |
| Domain | ID | Title | |

FIG. 8

Ranked Physician List!

FIG. 15

SYSTEM AND PROCESS FOR CONCEPT TAGGING AND CONTENT RETRIEVAL

BACKGROUND OF THE INVENTION

1. Field of the Invention

The present invention is directed to a system and process for tagging documents or other electronic content in order to facilitate later searching and retrieval.

2. Description of the Related Art

With respect to medical information generated during a patient encounter, documents and other content often are coded using language or codes mandated by insurance companies in order to facilitate billing and payment. These practices are useful for the insurance companies, but they may rely on non-medical terminology that is unnatural for medical professionals.

In addition, reference documents that the practitioner may want to provide to the patient often are not created using this coding, so it may making it harder to retrieve the content when desired. In an age where reference documents are created, transmitted, and stored electronically, a practitioner may be aware of only a small number of relevant documents. This disparity may impact the practitioner negatively by denying or limiting access to relevant, helpful content. For example, it may make it more difficult, time consuming, and/or costly to find the specific document or documents that are desired.

Moreover, in relatively complex fields, providers express their intent in many different ways. For example, in the medical field, that variability of intent may be reflected by the potential number of terms in a terminology being in the hundreds of thousands. When considering both the number of documents that may be available and the number of descriptions that may be present in those documents, the scope of locating one or more desired documents may be better appreciated.

What is needed is a system or process that makes searching for documents or other electronic content easier and overcomes the drawbacks described above.

BRIEF SUMMARY OF THE INVENTION

In one aspect, a process operable on one or more computers for tagging information with one or more descriptions pertaining to that content. This process may manifest itself in a plurality of use cases. For example, a first use case may include one set of content or information that relates to medical specialties in order to find a relevant medical practitioner. A second use case may be where the information is a plurality of reference documents. The process may comprise populating a database with a plurality of distinct concepts, populating a database with a plurality of descriptions, relating each description to a respective concept, reviewing the content for a satisfactory description match; and creating a tag for the satisfactory description match, the tag including a reference to a location of the match of the description and the concept, i.e., a "hit," within the content. Concepts may be well-defined clinical findings, i.e., items that are distinct by nature. Descriptions may comprise a plurality of words. Factors for determining whether the match is satisfactory may include whether there is a textual match between a portion of the content and the description and a distance between words in the content, the words corresponding to discrete words of each description. The process also may comprise the step of associating each tag to a related concept corresponding to a satisfactory description match, as well as calculating a concept frequency occurrence and weighting the electronic document with respect to other electronic documents, wherein the concept frequency occurrence is a weighting factor.

The process also may include displaying the electronic document and a visual indicator of the tag where the visual indicator is positioned within the electronic document at the location of the match. The tag may include several components, including a description, the location, and the associated terminology concept. Additionally, the process may include receiving a query for content, comparing the query with at least one of the descriptions, and returning a selectable list of results, the results containing the satisfactory description match. Each description may map to a concept, which may be expanded to other nearby concepts.

In another aspect, a process for tagging and retrieving electronic documents, which may include text readable by a computer, may comprise: populating a database with a plurality of descriptions, populating a database with a plurality of distinct concepts, relating each description to a respective concept, applying a plurality of description tags to a document in a plurality of locations within the document, creating a link between the document and descriptions and, by extension, concepts related to the document, wherein the related concepts are related to the plurality of description tags, ranking the document against other documents using at least one of the description tags and the related concepts; and displaying a list of documents ordered by document rank. The process also may include recording a history of documents selected from among the list, and reordering the list in view of the history by raising the document importance and ranking.

The plurality of concepts may be interrelated in a tree or graph structure. Multiple descriptions may belong to one concept, and each concept may belong to one general domain, i.e., a distinct category such as problems, procedures, diagnoses, medications, allergies, etc. Necessarily, a concept has at least one description. In addition, the process may include the steps of displaying a selected document with the applied description tags, including visually distinguishing between description tags relating to a first domain and description tags relating to a second domain, and recognizing description tags that might have been applied improperly.

In still another aspect, a system for automatically tagging and manually editing electronic content may comprise: a plurality of concepts, a plurality of descriptions, wherein the descriptions have a many-to-one relationship with each of the concepts, a plurality of content tags, wherein the content tags have a many-to-one relationship with the plurality of descriptions, a plurality of information or documents, wherein the information or documents have a one-to-many relationship with the plurality of content tags, and a database including a table for storing information relating to the electronic content. The system also may include at least one user interface configured to view and modify at least one of the plurality of concepts, the plurality of descriptions, the plurality of content tags, and the plurality of items of electronic content. The plurality of concepts may be interrelated in a tree or graph hierarchy. The electronic content may be a plurality of electronic documents or, alternatively, may relate to a medical professional's specialties or expertise.

These and other features and advantages are described in the following description of the present invention, with reference to the accompanying drawings.

BRIEF DESCRIPTION OF THE SEVERAL VIEWS OF THE DRAWINGS

FIG. 7 is a portion of a document, including examples of embedded document tags.

FIG. 8 is a screenshot of exemplary window tabs for a document descriptions window.

FIG. 10, are an example of a document search workflow.

FIG. 15 is a screenshot of a tool for automatically parsing and tagging a plurality of documents.

DETAILED DESCRIPTION

Figure 1:
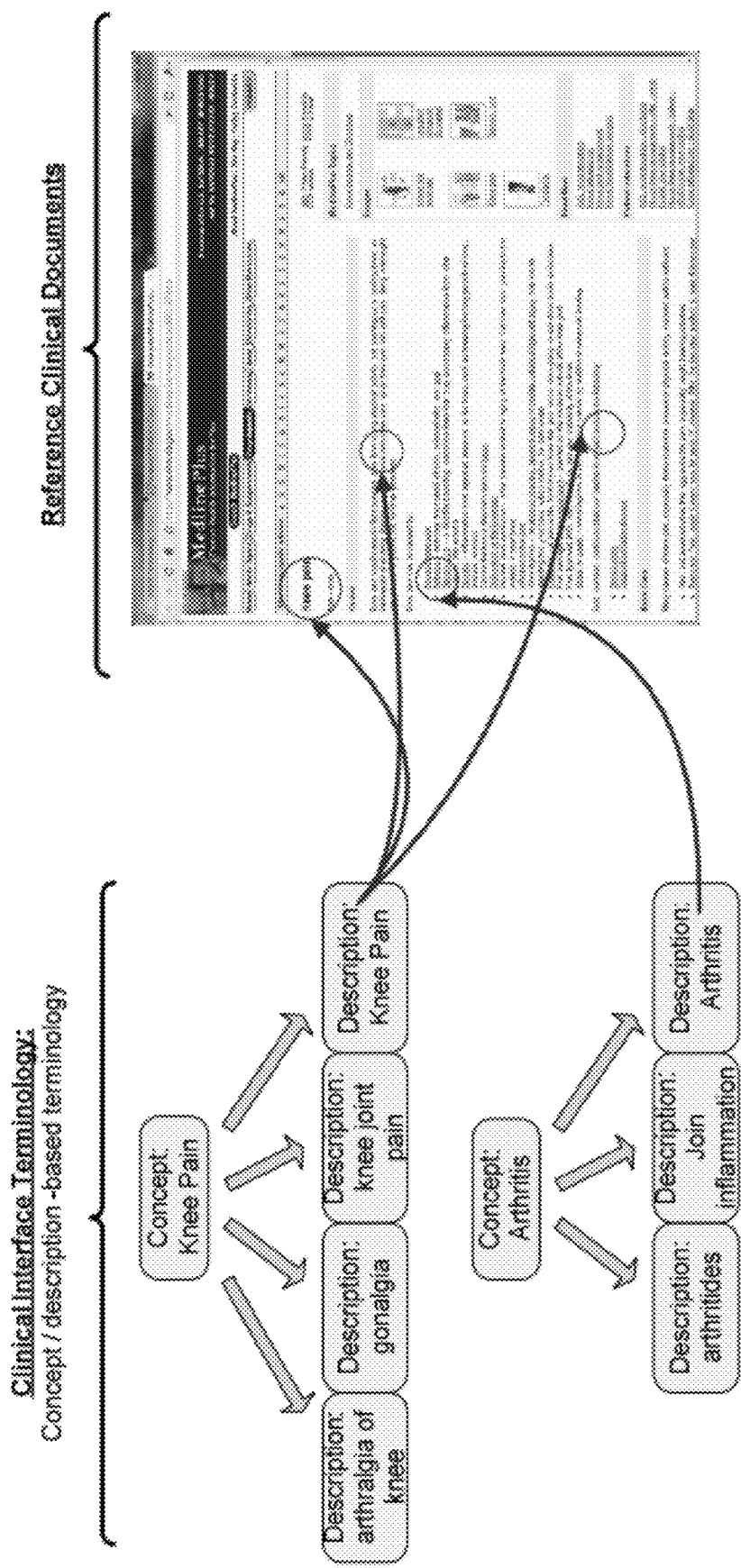
FIG. 1 is a depiction of how concepts and descriptions/lexicals relate and how descriptions map to documents.

A system and process for tagging electronic documents or other electronic content or information with concepts mentioned, contained, or otherwise described in that content. Once tagged, the content may be searchable, indexable, and retrievable in ranked order to provide that content to an end user or another recipient using codified terminology. The system may be configured to handle a considerable number of documents, content, or other information and a large number of users, workflows, and application access simultaneously. The system and process may be particularly useful in the medical profession and will be described herein in relationship to that profession, although it has similar applicability in other fields. In one embodiment, the documents may be reference documents that include information related, but not limited, to procedures, diagnoses, medication, allergies, etc. In a second embodiment, the content may include information about various care providers.

The system may be configured to auto-highlight and/or tag words or phrases, such as those relating to problems, procedures, diagnoses, medications, allergies, or other categories. These distinct categories may be considered "domains" to which concepts and descriptions (discussed below) may be related. The system also may include one or more user interfaces for confirming and updating those tags and for manually creating new or additional tags. The keyword tags then may be stored in a format usable by client search tools, allowing users to find documents or other content that are the most relevant to the searched description. This may result in more relevant data being more easily accessible, that data being further simplified in a search database.

Typical databases currently may not be designed to deal with the amount of information contained in the documents and produced by the cross-mapping. As such, in one embodiment, the document searching, tagging, and cross-mapping process may occur each time a query is made. Preferably, however, instead of real-time queries, pre-compiling may occur and be refreshed on a periodic basis. For example, authoring tags may occur at any time while precompiling, which may occur once a day, such as during off-peak hours.

A relational database may be used to store relevant information, e.g., reference documents (or at least their text), care providers' specialties, etc. The system also may include an editing tool for use in working with the information. In order to improve system scalability, the system may precompile the information stored on the relational database. In addition, the system may transform the content of the relational database, reformatting it. Once reformatted, that content may be stored in another database that may be used for searching, i.e., searching and editing may be effected with two separate databases.

In this fashion, queries may be processed on one database while tagging may occur on another database. By searching these pre-compiled queries, the system may return results significantly faster. In addition, the speed of the process may be further increased in an alternate system in which the second database is an "in-memory database." This database may allow for significantly faster data transfer as compared to I/Os from relational databases. For example, a query on an in-memory database may take about 40 milliseconds as compared to about 45 seconds when querying a relational database.

Document Concept Tagging Process

In one embodiment, the system may be considered a "document concept tagger," which may be a tool used to track and store electronic documents and/or images of documents. Within these documents, the concept tagger may track metadata and word-tagging such that when a document is searched using predetermined search parameters, it is easier for a user to locate a relevant document. The system also may provide storage, versioning, metadata, and indexing and retrieval capabilities. The result is a highly compartmentalized digital asset management and workflow management system that records access, highlights word-tagging, and updates user-based document examination.

The method may include linking reference clinical or medical documents to a codified, clinical terminology. This terminology may be preexisting or predetermined. Additionally or alternatively, terminology may be created or updated on an ongoing basis to include new or additional concepts or descriptions. The method also may create or compile a list of documents ranked by importance for each terminology description. At a broad level, the tagging method may involve two steps: first, reference documents may be stored, e.g., in a relational storage, to facilitate concept tagging and workflow management. In this step, document states may be managed and flagged for inclusion along clinical descriptions. Second, concept and/or description tagging may result in the ability to produce crossmaps from one or more descriptions to one or more ranked documents. This information then may be used in a number of applications.

Concepts and Descriptions/Lexicals

Document tagging includes recognizing medical/clinical concepts that are part of the document text. Tagging may make use of terminology in order to locate medical/clinical descriptions within documents. The terminology may include both proprietary or generic medical/clinical terminology, including, e.g., SNOMED CT, MeSH, UMLS, etc.

Terminology may be organized around clinical concepts, which may be defined uniquely, and around concept-attached descriptions/lexicals, which may comprise alternative possible ways to express the parent concept. Preferably, the system may not contain any duplicate concepts or descriptions within a given domain. Concepts may encompass well-delineated medical findings. In addition, concepts are specific; the concept "knee pain" means knee pain and not hip pain, leg pain, etc. Conversely, descriptions/lexicals reflect that the same concept may be expressed in several different ways, e.g., knee pain vs. pain in the knee. As such, there may be a one-to-many relationship between concepts and descriptions.

Reference documents may be any type that includes text, including, e.g., HTML web pages, XML documents, PDF documents, or any other types of (readable) electronic document format, i.e., a format for which the content is machine-readable. Reference documents also may include images. Although generally not readable using text-reading tools or optical character recognition, it may be possible to tag these images, e.g., manually, with related descriptions. Documents may be a locally stored catalog and/or may be obtained through various means from external sources, e.g., by using web "crawlers" to explore relevant or reference Internet websites.

Each term/description/lexical/tag identified in the document is associated with a Description identifier and, by relation, a Concept identifier. For example, and for the sake of description herein, each identifier may be a unique number, i.e., a concept number/value for concepts and a description number/value for descriptions.

Each concept may have both an ID and title. The Concept number value may be the ID assigned to the concept description. Similarly, each description may have both an ID and title. Each concept may have one or many descriptions mapped to it. In one embodiment, concepts may be proprietary descriptions created by the system user. Searching and reporting may be accomplished using descriptions, after which a concept-description match may be used to rank or order documents. Descriptions may be the tools/strings/values used for searching, and the concepts then may be used to find a relationship to documents.

The description number value may correspond to an ID assigned to the description that most matches the tag. The descriptions may be consumer terms or professional terms. Descriptions may include a plurality of flags. For example, one flag may be used to distinguish whether the description represents a consumer term or a professional term. A second flag may be used to denote whether the description is a preferred term or non-preferred tem. Preferably, descriptions may include the description or text utilized by clinical professionals in documenting patient records, billing, etc. They may be the lowest, most detailed level of description for each domain, e.g., for each procedure, diagnosis, etc. As such, descriptions may be the means to express something, albeit not uniquely, as two descriptions may have two different intents, even if they relate to the same concept.

Each description may be mapped to an administrative code (CPT4, ICD-9-CM, ICD-10-CM, etc), as well as to reference terminology, such as Systematized Nomenclature of Medicine—Clinical Terms (SNOMED CT) concept. Other domains, e.g., medications, also may be included and mapped to. Concepts may have a plurality of mapping types, e.g., one to reference descriptions and one to administrative descriptions. Maps to other codes may include unique references and IDs.

Because descriptions are meant to capture a care provider's clinical intent, multiple descriptions may exist and may correspond to a single concept. For example, the descriptions: "chest pain," "pain, chest," "myocardial infarction," and "mi" all may correspond to a single concept of "myocardial infarction."

Parsing Algorithm

Each concept may be expressed in one or more ways as a distinct term. The parsing process may comprise "recognizing" medical/clinical concepts within the text of a document, and as such, creating a link between terminology and the document. In a broad sense, the algorithm may determine where and how often certain descriptions appear in the document, either loosely or specifically. If a description appears multiple times in a document, the algorithm may recognize this fact and weigh the document more significantly, such that a search of all documents containing that description may result in a listing with that document at or near the top of the results. The number of times a description appears may be its frequency. Frequency ranking of concepts may occur by analyzing descriptions but by then reporting at the concept level.

By way of example, FIG. 1 shows an article from NLM MEDLINEPLUS regarding knee pain. As seen in FIG. 1, a concept may be described as one or more descriptions, and a document may relate to multiple concepts via those descriptions. A concept may have multiple descriptions. In addition, in one embodiment, one of the descriptions may be the same as the title for the concept. Moreover, a document may be tagged with a description multiple times, i.e., in multiple locations (unlike metatags, which traditionally are applied at the top of an electronic document and may be applied to the document as a whole to describe the document). In the example of FIG. 1, the document is tagged in three places with the concept "Knee Pain" via the description "Knee Pain" and in one place with the concept "Arthritis" via the description "Arthritis."

The concept tagging process may or may not be a natural language processing process that can parse the text, e.g., to identify nouns, verbs, etc., and the context in which they are used. The system may include a tagging engine with files, terminology, a tagging algorithm, a database to store tags, and a reverse index that may lead to data crunching, leading to serving data. Descriptions may be tagged without respect of the syntactic structure of the document. For example, a document may contain the phrase "pain in the knee" and the heuristic used with the system may determine that this refers to the description "knee pain" based on the separation between words in the phrase. As discussed below, the system may include document weights by which more precise matches are given more weight and matches requiring additional inference may be given less weight. These "close" and "loose" relationships then may be used to create document ranks in order to determine the order in which they are presented as search results.

The system may highlight potential descriptions based on actual verbiage, devoid of context. For example, a parsing program may identify the word "eye" and highlight it as a description in the document. However, in context, the highlighted description may actually be part of a sentence that states, "Jane poked John in the eye." In this context, eye is not being used to describe a medical procedure, and it also may not be used to describe a diagnosis (although it may relate to a diagnosis, e.g., of eye trauma). In another example, a document may highlight the word "fall," but the contextual occurrence of the word may refer to "Fall 2010" and not conditions or diagnoses relating to a patient falling down. In both of these examples, the documents may be reviewed, e.g., manually, and the tags possibly removed.

Concept tagging also takes into account the best terminology description fit—the description with the most specificity—at any point in the document.

The document parsing result is a set of 'document tags,' identifying the description references and location of such descriptions within the document.

The terminology, i.e., the list of descriptions, may be very granular, allowing the system to find many clinical/medical concepts present in the text.

One set of processes for reviewing and tagging a document may be as follows:

Using the Tool

The system may include a user log-in process, e.g., to identify the user and to open the user's document tagging history or workspace. After logging in, the user may be presented with a first window displaying a search tool or a task list in order to enable the user to find and retrieve the desired document. Once the document is retrieved, a plurality of windows may open side-by-side. One may be a "Document Concept Tagger" window, and the other may be a "Document Descriptions" window. The Document Concept Tagger may handle two functions: task list and document viewer. Initially, the window may display all available documents in a Task list view. These can be sorted in a number of different ways, including, e.g., by State, Task Owner, and Vendor (or document source).

Menu Bar

Figure 2:
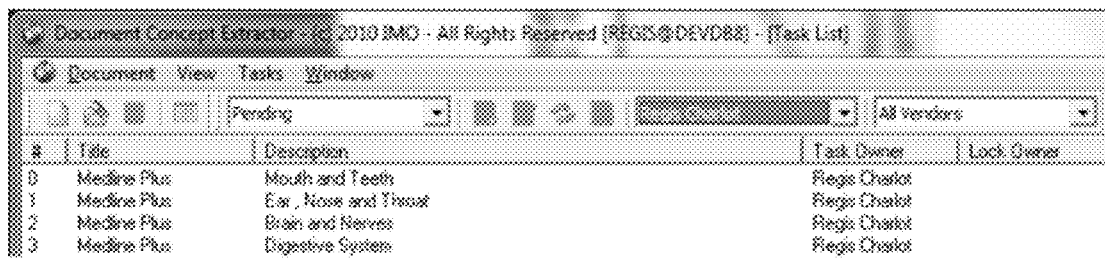
FIG. 2 is an exemplary header to a document task list.

All documents not overlooked and not parsed through, e.g., by hand, may have problems such as the "eye" and "fall" examples discussed above. These unparsed documents may be placed on the Concept Tagger's Document Task List. As seen in FIG. 2, the list may include a plurality of drop-down menus or lists. One menu may be used to select documents based on the task status. A second menu may include a list allowing the documents to be sorted based on who has checked out or has access to specific tasks. A third menu may indicate the specific vendor or document provider/generator that is associated with the task's content.

Documents

The system may include a "Document" dropdown or tab, which may include options such as: Create a new Document, Open a Document, and Save a Document. The system also may include corresponding toolbar buttons below the Document menu.

Figure 3:
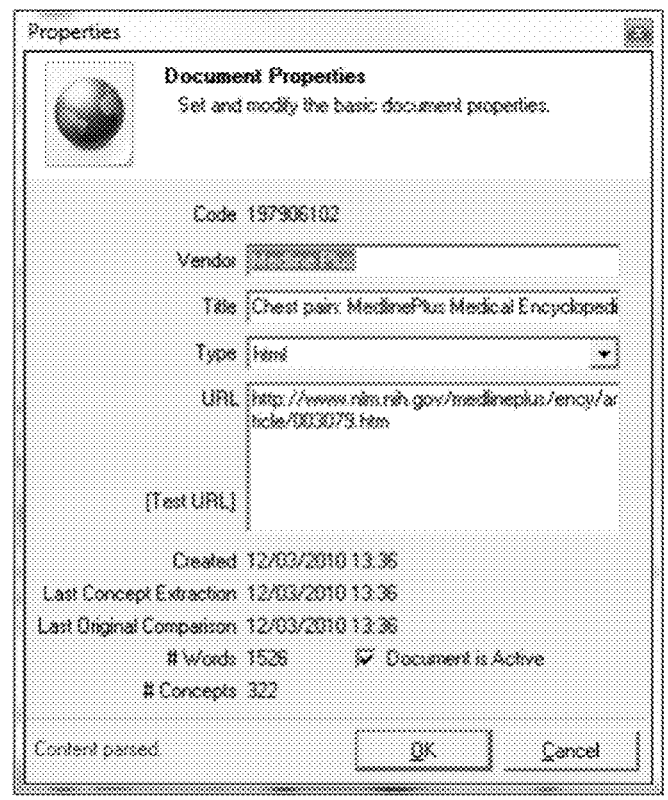
FIG. 3 is a screenshot of a document properties window.

To add a document to the database, the user may click on the Create a Document option in either the dropdown or the toolbar. A Properties window such as the one shown in FIG. 3 may open, allowing the user to enter the information required to create the new document. This information may include, e.g.: Origin, Title, Type and URL. Origin is the source of the document (e.g., WIKIPEDIA). Title is the title of the document. Type provides a drop down list of currently allowed formats, e.g., html, xml, or an image format, although other formats are permissible. Preferably, the system may auto-detect the format of the document or webpage being processed, e.g., by analyzing the file extension, although the system also may allow the user to choose the document format. URL is the exact URL used to access the live webpage. The new document window also may provide the user with the option to choose whether the document should be entered as active (default) or inactive. Upon clicking OK, the webpage at the specified URL may be pulled in to create a new document, which will open automatically when ready. Alternatively, a cached copy of the URL may be obtained. This option may be useful if the document is listed as "inactive" or it may serve to make the process faster since the cached copy may be retrieved from this local source more quickly than if the document were retrieved from an active URL.

In another embodiment, the system may use other locally stored files to create documents. In this embodiment, the URL field may be replaced with a "Path" or similar field in which the user inputs the local file location for importing into the database.

Figure 4:
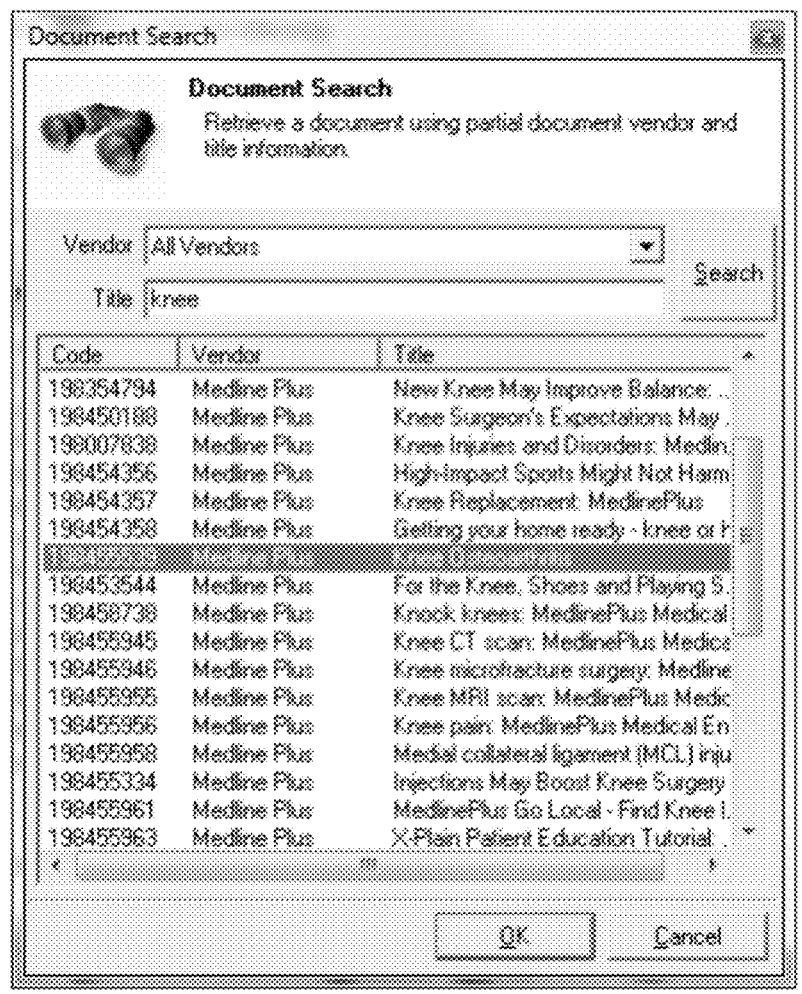
FIG. 4 is a screenshot of a document search window.

Turning to FIG. 4, the "Open Document" capability essentially may be a search engine within the Concept Tagger, allowing the user to search the database for documents regardless of whether they have an associated task (described below) or not. The example shown in FIG. 4 is a document search of any task or keyword that includes "Pulmonary" in its title. The more specific a user is with the search criteria, the fewer documents the search engine may retrieve. Similarly, the search engine may be configured to search the text of the document or the document tags, in addition to title searches.

The "Save a Document" option may become enabled when a user viewing a document has made changes to the tagging.

Tasks

Figure 5:
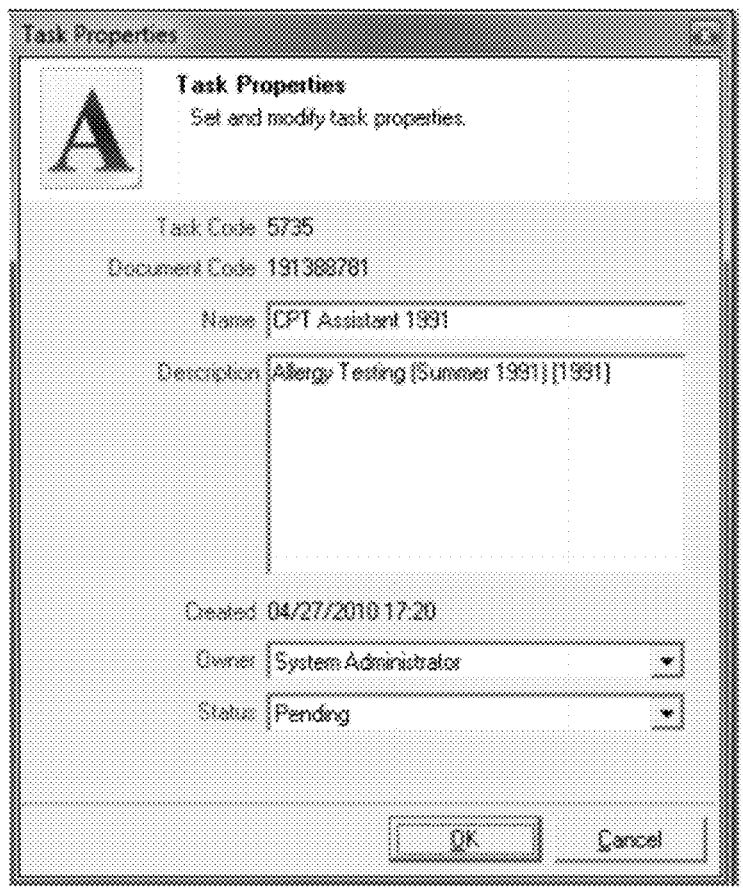
FIG. 5 is a screenshot of a task properties window.

Returning to FIG. 2, the system may include a Tasks dropdown and/or corresponding toolbar buttons. The Tasks menu may include a plurality of options, including, e.g., Create a New Task, Edit Task, Refresh Task List, and Open a Document. The 'Create a New Task' capability gives the user the opportunity to create a new task for an already created document or assigned a new document for review. The 'Edit Task' option may open the Task Properties form for the selected Task such that a user can edit the task's Name, Description, Owner (who it is assigned to) and Status. An example of this form may be seen in FIG. 5. Task status can be modified, e.g., set to pending, completed, cancelled, skipped or waiting for review.

Returning again to FIG. 2, selecting 'Refresh Task List' may refresh the task list view to display any changes since the task list was opened, including changes to any documents or other user updates. 'Open a Document' may open the selected document for review and populate the Document Descriptions window with associated values. This option may be employed most by Task Reviewers, allowing them to review the document and edit the document's tags.

Filters in the toolbar allow the user to filter the task list according to various predetermined criteria, including, e.g., status, assigned Owner, and/or Vendor of the document. Selecting a value will refresh the task list appropriately. To remove a filter, select the "All" option in that dropdown field.

Auto Tagging a Document

The system preferably auto-tags all of the documents made available to it. To automatically tag a specific document, the user may open the document, enabling a "Parse" option, e.g., in the application's menu bar and/or via a toolbar button. Selecting this feature may cause the system to automatically parse through the entire document and highlight any term or phrase that parallels a description variable from all domain sources. If previous tags were parsed, they may be reprocessed.

If the document is already open and has its variables highlighted, a dropdown list associated with the tagging button may indicate a plurality of list variables, which may be categorized in groups conceptually as separate domains or physically as separate databases such as ProblemIT and ProcedureIT. If it is desirable to parse the document looking for fewer than all tags or to display fewer than all tags, the system may allow the user to deselect at least one of these lists. For example, if the user desires to tag the document and/or display the descriptions contained in the ProblemIT list, the ProcedureIT box may be unselected and de-highlighted on the dropdown list, such that the ProblemIT box is the only one checked or highlighted. Similarly, to have only the ProcedureIT descriptions tagged, the ProblemIT box may be unselected and de-highlighted, leaving only the ProcedureIT box checked and/or highlighted. Once the list variables have been selected, the user may click on the "Parsing" button, causing the program to automatically parse through the document, looking for terms/descriptions associated with the selected database(s).

This process may be used to differentiate "problem" coding from "procedure" coding, e.g., ICD9 coding from Medical Procedures, or ProblemIT from ProcedureIT. For example, when the program parses a document, it subsequently may highlight 'Laboratory procedures' as terminology for both ProblemIT and ProcedureIT, even though Laboratory Procedure may be a medical procedure and not an ICD9 code. Thus, changing the list of parsing terminology sources may correct the tagging problem.

Figure 13:
FIG. 13 is a screenshot of a tool for selecting a domain/document location to automatically retrieve a plurality of documents.
Figure 14:
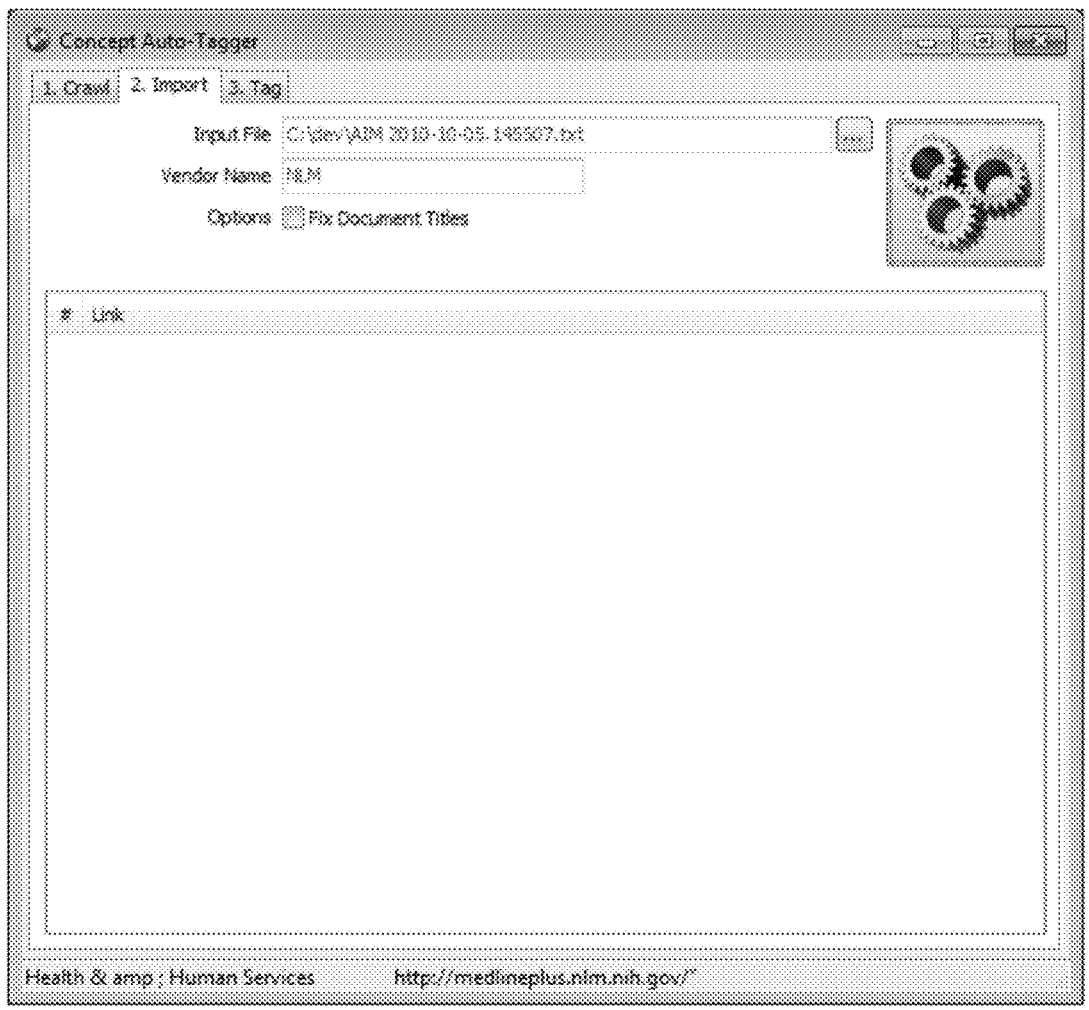
FIG. 14 is a screenshot of a tool for importing a plurality of documents from a selected domain into the system.
Figure 15:
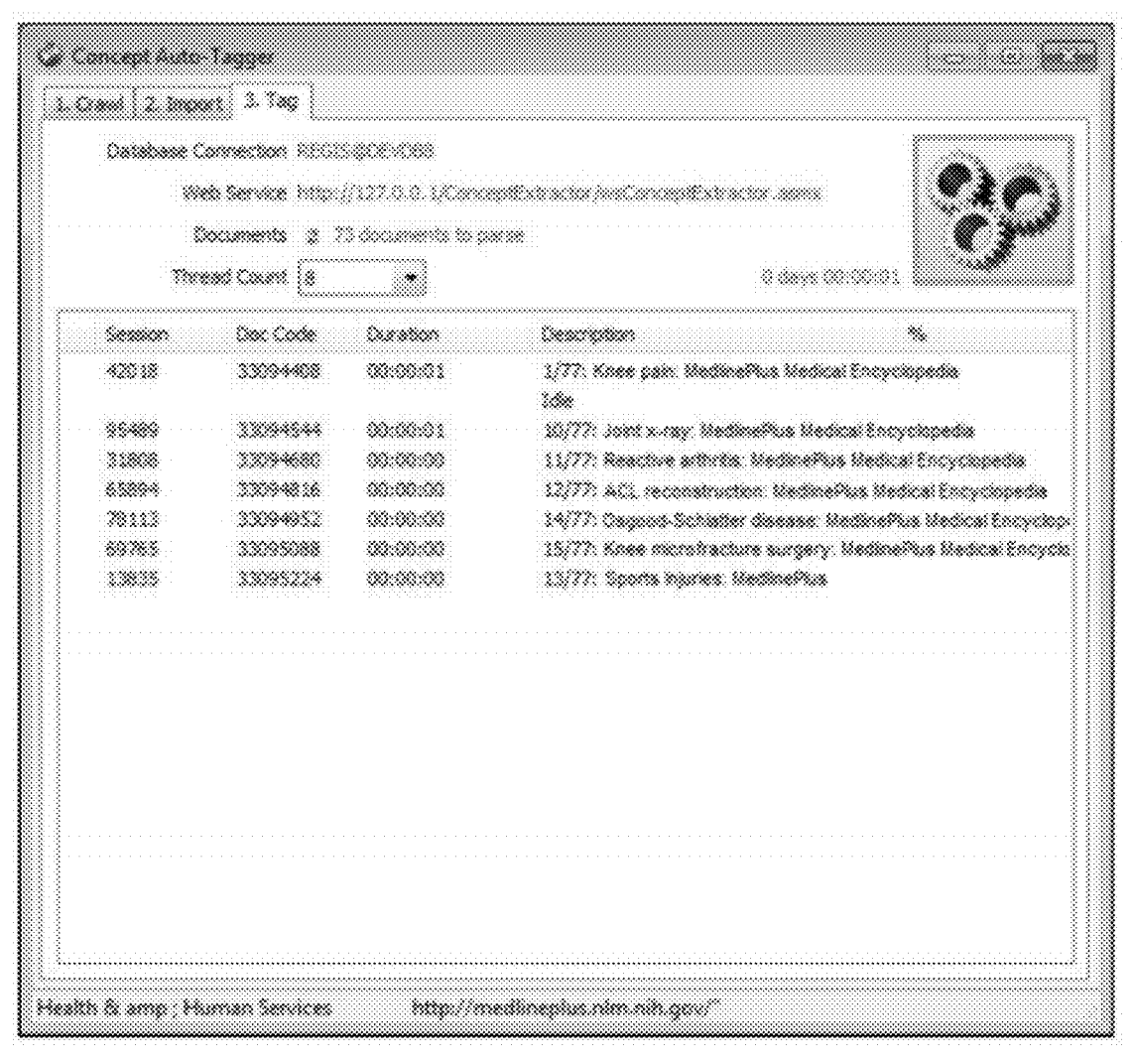

The system also may include an auto-tagger that may automatically retrieve a plurality of documents from a selected location, crawling the location to obtain the documents, importing them into the system and adding them to the document database, and then automatically reviewing and tagging them, as seen in FIGS. 13-15.

As seen in FIG. 13, this auto-tagger may prompt the user to enter a target URL or document source location and a document domain, i.e., document originator identifier. The tagger may then crawl the target location looking for the location of documents. Turning to FIG. 14, once the system crawls the source, it then may import the documents into the system. These documents may be stored in the document database with other already-obtained documents, or they may be stored in a buffer until tagging is complete.

Turning now to FIG. 15, the system may indicate how many documents were retrieved and require parsing. The user may select a thread count, i.e., a number of documents to be parsed concurrently. A higher thread count may allow more documents to be processed at once, but may require increased system processing usage. Conversely, a lower thread count may use fewer system resources, resulting in faster parsing, but it also may require the user to be more hands-on, verifying that parsing of one subset is complete and then starting to parse a later subset more frequently than if the thread count were higher.

As shown in FIG. 15, the system may apply unique session identifiers and document codes to each imported document, which may help the user later verify that a certain document was parsed and also may avoid the same document being parsed multiple times. In addition, the system may display both the elapsed duration of parsing and tagging and the percentage of the process that is complete, in order to provide the user with an indicator of the parsing and tagging process.

This auto-tagging tool may allow for the substantial hands-off retrieval, importation, and tagging of a large number of documents, which may provide increased efficiency and system capability over the manual tagging tool described above. However, the manual tool still may be used for later review of individual documents, as described below.

Reviewing and Manually Tagging a Parsed Document

Selecting a task or document and opening it may refresh the Document Concept Tagger window or may replace that window with the appropriate content of the document, displaying the tagged concepts. For easier viewing, the keyword highlights may differentiate the parsed text, e.g., by applying colored tags. For example, procedure tags may include a green background while diagnosis tags may include a background that is purple. In addition, selecting a document may open or refresh the Document Descriptions screen/window, which then may list all the words tagged in the opened document and the data (e.g. Description and Concept IDs) associated with those tagged words. Perusing through the tabs on this window may provide further details on word position, etc.

The Document Concept Tagger window may provide for manual review of the auto-parsed tags, to confirm that the most relevant keywords are available and applied correctly. For example, as discussed above, automatically parsed and categorized documents may have description associations that, devoid of context, may appear to be relevant words or phrases but that, when put into context, may have nothing to do with the document in full.

Figure 6:
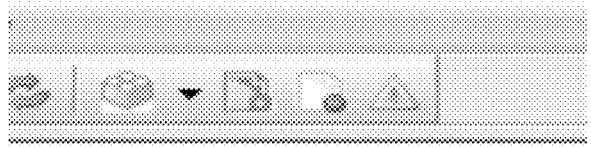
FIG. 6 is an exemplary add/delete/false positive toolbar menu.

The document may include review options to manage the descriptions tagged or not tagged in the document. These options may include: Manual Edits, False Positives and Deleting, and they may be employed with toolbar buttons such as: Add, Delete and False Positive, as seen in FIG. 6. The reviewer may notice that a description has not been tagged and, if so, may highlight the text and click 'Add Lexical Tag.' For example, if "etiology" is not tagged, the user may highlight the word and click on the 'Add Lexical Tag' option. A popup that has already searched ProblemIT for the highlighted text may open. In this example, highlighting "etiology" may return "etiology, operative procedure, as a cause of . . . " as the nearest related Description term. If the term is part of the procedure domain, the user may select ProcedureIT and search.

In the preceding example, if no description source/database has results that are suitable, then a 'New Tag' tab allows the user to manually enter the desired text. The system also may alert system administrators that a new description has been created, and it may prompt them to consider adding the new term to other products or including it in future document searches. Manually adding a tag may add it to both the document and the list displayed in the Document Descriptions window. In addition, the system may visually distinguish a manually entered description, e.g., marking it with a red bullet point and/or a flag such as "ME".

Additionally, this new tag may not correlate to any existing concept. In this case, the user may designate the new tag as a new concept instead of a new description within an existing concept.

If a tag is completely inappropriate, multiple options may become available to the user once the Description term is selected. If the specific tag occurrence is not medical and/or not appropriate or germane to the document's intended meaning, the system may include a "Delete" option to remove just that single tag occurrence. Similarly, the system may include a "Delete All" option to remove all similar tags in the document.

Additionally, the system may include a "False Positive" option. In these cases, the highlighted term may be used in a medical context (or whatever context encompasses the documents being tagged), but it is not relevant to the current document and should not be used for searching. For example, a description tag may be applied to the word "Ophthalmology," but the whole sentence in which it appears may state "A manual of Orthopedic Terminology Textbook of Ophthalmology Flaps of the Head and Neck." In this example, it may be preferable to label this as a false positive rather than to delete the tag. Clicking on the desired action button will remove the tag from the document and denote it as such in the Document Descriptions window.

In one embodiment, deleting or marking tags as false positives may prevent the tag/description from being displayed. However, the tag may not truly be "deleted." Rather, it may exist, and the system may include an instruction or flag to not display the tag or to include it in searches, i.e., the concept may be tagged as deleted. This option may be beneficial in that it may maintain a record that the word or phrase previously was searched and that a tag previously was applied. This may help the system and/or later reviewers know to not reapply the tag if the document is reanalyzed at a later date. This option also may be beneficial in that it allows the system to include "Undelete" or "Unset as False Positive" options to return the document tagging to a previous state.

One example of the benefits of manual review may be seen in relation to FIG. 7, which shows an excerpt of a document that has been tagged automatically. The document (taken from *Diagnosis and Treatment of Oropharyngeal Dysphagia*) discusses Sjögren's Syndrome. Automatic parsing of the sample paragraph has highlighted 'Syndrome,' because it does not recognize the author's spelling of 'Sjögren's Syndrome.' If the tags were used as-is, a user of a search engine would not be able to type in "Sjögren's Syndrome" and have it pick up this document. In this case, a Task Reviewer may recognize the omission and manually retag the relevant data.

Staying with FIG. 7, a second example of the benefits of manual review may be seen, namely the ability of a Task Reviewer to manually add descriptions and/or new concepts to the document and, in the case of concepts, to the concept database. For instance, the second bullet in FIG. 7 starts with "A history of dry mouth . . . " Although the parser recognized the concept "dry mouth and eyes," it may be desirable to add the "history of dry mouth" phrase as a tag or description within that concept. To do this, the reviewer may highlight the text and select "Add." The user then may be able to search for existing descriptions or request a new description be added that fits the highlighted phrase.

In addition to creating documents that are ready for manual review, auto-tagging may be beneficial in that it also may help a reviewing team categorize and distribute documents among the team members. For example, one reviewer may be responsible for documents that primarily deal with knee injuries. In this case, once auto-review is complete, the system may automatically forward documents that include tags/descriptions related to knee injuries (e.g., "knee pain," "acl injury," etc.) to that reviewer. This process may make the system more efficient by automating the division of work. In addition, it may lead to better results, because designating a reviewer to deal with a certain topic may cause that reviewer to be more proficient and to more quickly and accurately recognize false positives and any need for new descriptions or concepts.

Viewing a Document with and without Tags

It may be desirable to have the option to view a document with or without tags, e.g., to make it easier to search for appropriate keywords or to view the document tagging history. As such, the system may include a list on the dropdown allowing the user to choose from among a plurality of viewing options. These options may include: Original Text, Tagged Text [All] Tags, Tagged Text [Active] Tags, Deleted Tags and Verbatim. Original Text may display the imported document. This option also may include the word parsing processing, so that clicking on a word may show the position number in a status bar. Tagged Text [All] Tags may display active and deleted tags together. Tagged Text [Active] Tags preferably does not display deleted tags. Conversely, Deleted Tags may display only deleted tags. Verbatim may display the document as it was imported, but unlike Original Text, this display may not include processing.

Document Descriptions/Lexicals Window

As stated above, one of the other windows that may appear when a document is retrieved after the Concept Tagger program is opened may be a Document Descriptions or Document Lexicals window. As seen in FIG. 8, this window may include a plurality of tabs, such as: Lexicals, Content Portions, Words, and Weighted Lexicals. Each of these tabs may provide details for the document's content and tags and may play a large part in the data management.

The Lexicals tab gives the information of all the Descriptions tagged within the current document. This may include each Description's: Domain, ID, Title, Flag, Description Number and Concept Number. 'Domain' may include stratified information, i.e., it may describe the field to which the descriptions apply or the type/category of terminology that is being used. In one embodiment, possible domains may include 'ProcedureIT,' 'ProblemIT,' and 'Harvest Pool.' ProcedureIT descriptions may be associated with medical procedures, and ProblemIT descriptions may be associated with diagnosis descriptions that are confirmed medically viable terms. Harvest Pool terms may be terms that have been tagged recently in the document as being possibly viable medical descriptions that should be analyzed and considered for addition to the other domains. Harvest Pool items may not be selectable in other documents, i.e., not until they have been considered and added to another domain, so duplicates may be requested as additional documents are reviewed.

Continuing with the other information listed in the Lexicals tab, ID may be the position of the tag relative to the already tagged verbiage in the document. Title may be the selected description for the tagged word/phrase. The flag option may denote the presence or absence of manual changes by reviewers. Description or Lexical number may be a code for the description in the associated domain. The Concept number may be the number associated with the concept to which the pertinent description is mapped. As such, concept number may be distinct from description number. For example, "Venous Catheterization" may have a description number of 944814 and a concept number of 483176.

The Content Portions tab may be used to describe the position and size of the content that was parsed. For example, if only the second paragraph had been set, the starting number may be 2 or some number other than 1. This feature may be useful if the document includes headers, title bars, advertisement text, site indexing, or other text that is substantially irrelevant to the document text and for which parsing is not desired.

The Words tab may display every word in the document. Information that may be displayed under this tab may include 'ID,' which may be the numerical order value, 'Starting,' which may be the position in the character position in the document, 'Length,' which may be the character length of the word, and 'Word,' which may be the actual word.

The Weighted Lexicals tab may allow descriptions tagged within the document to be listed by weighted value reflective of the number of times each description appears in the document. In addition, this feature may display description weights that reflect the system's estimation that a tagged description applies to a given phrase in the document. For example, the program may analyze the phrase "knee pain" and tag it with the description "knee pain," giving it a high weight due to the exact text match between the phrase and description. Similarly, the system may analyze the phrase "pain in the knee" and tag it with the same "knee pain" description, but ascribing a lower weight value.

Document Parsing Team Workflow Management

Document parsing by a team of knowledge team individuals is based on the ability to enable such team to manage a list of documents to be reviewed, to allow at most one individual to open document, to be able to automatically parse such documents for concepts, to review tags, to add new tags by hand, and to set documents as complete. Managed team document parsing is achieved by using tasks as a way to identify documents for which review is requested. Tasks may be references to a document or indicators of an item or items that must be addressed with respect to the document, i.e., a document may have no associated tasks if nothing is required to be done, or it may include one or more tasks if one or more things need to be addressed. Conversely, each task may map only to a single document, i.e., a reference document. In addition, each task may include a state, e.g., pending, active, closed, etc.

When a team member opens a task—his/her task or anybody else's task, and if this document is not currently opened by anybody else, then a lock may be put on this document, setting exclusive access for the member until the document is closed.

Opening a document for review may lead to the following activities:

Current tag review: As discussed above, tags may be 'deleted' (or soft removed—because out of place) or set as false positive.

The user may be able to select one or many document words and search for a description that would match those words. If no such description exists in the system's terminology, the user may be able to make this set of words or 'term' a new description and trigger a term creation for the knowledge team.

Once review is complete, the reviewer may save the document back to disk and also may close the task.

Document Storage Model for Administrative Purpose

Figure 9:
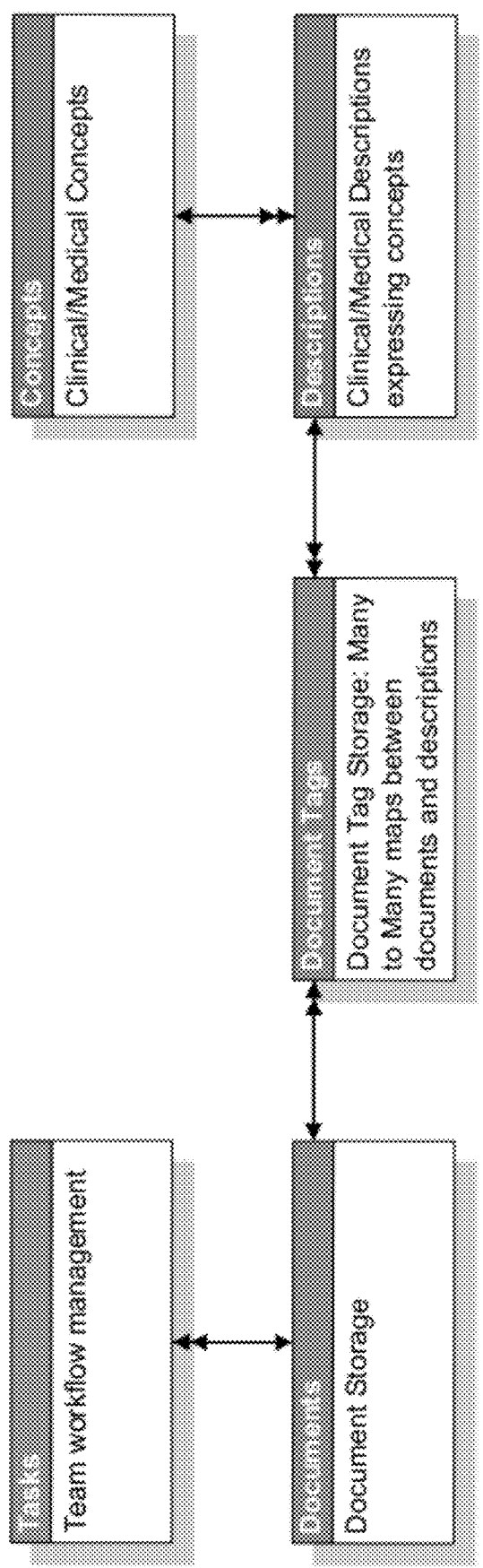
FIG. 9 is a document storage model for use with the document tagging system.

The document storage model, as shown in FIG. 9, preferably is rather simple. As seen in FIG. 9, documents may be kept in a 'document' table, with information such as document code, title, document vendor (who created this document), origin document URL, and document content. Concepts and descriptions may be kept in a master-detail table set, as a reference table set. Document tags may be kept in one table and may reflect a many-to-many relationship storage between documents and descriptions. In addition, the document tags box as shown in FIG. 9 may represent a relational table, i.e., a helper table that facilitates the many-to-many relationship between documents and descriptions. The document tags storage may include active tags, as well as tags flagged as 'deleted' and 'false positive.' Additionally, tasks may be pointers to documents, and tasks may indicate document review needs, both past and present.

Document Retrieval Process

Figure 10A:
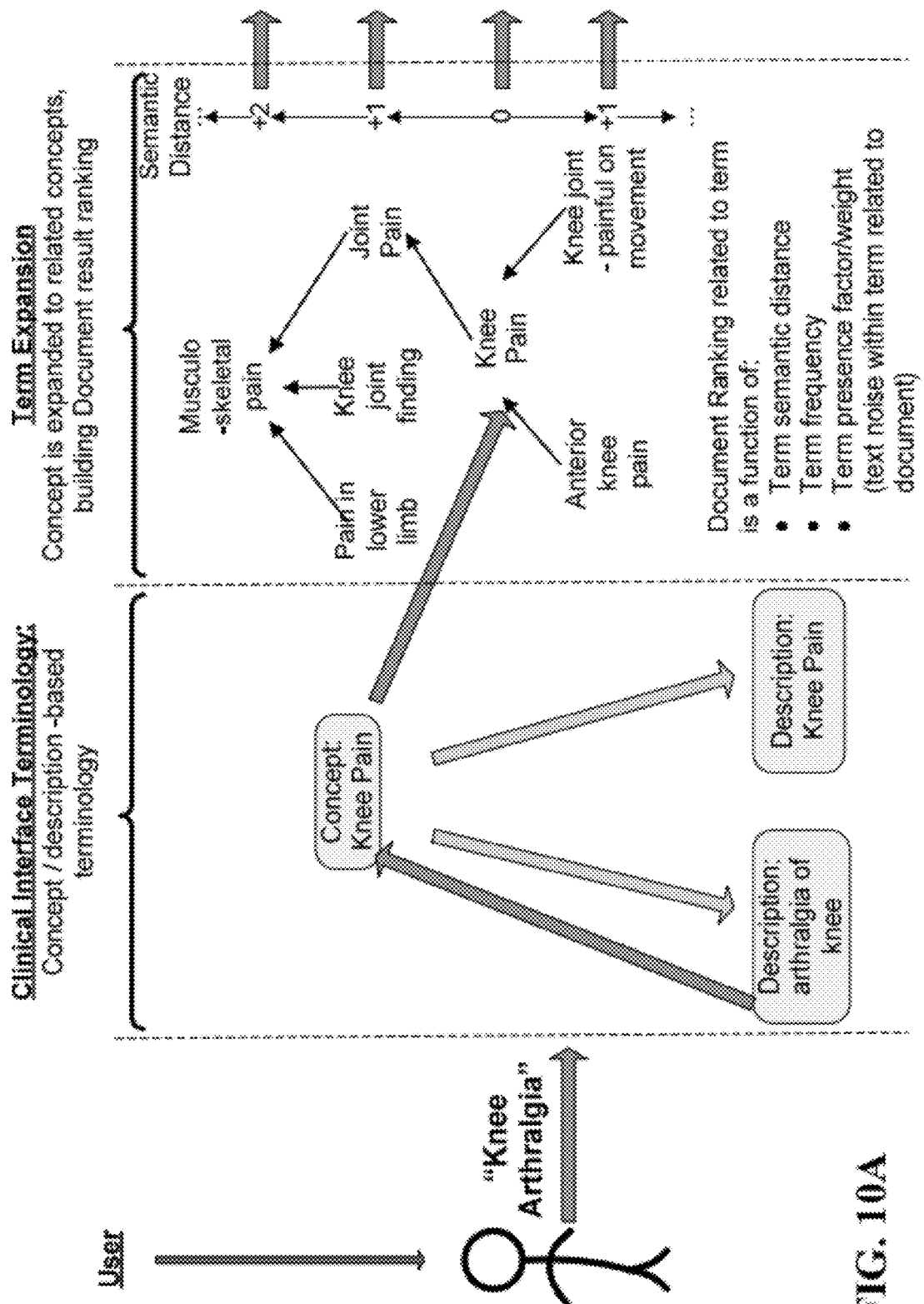
FIGS. 10A & 10B, collectively
Figure 10B:
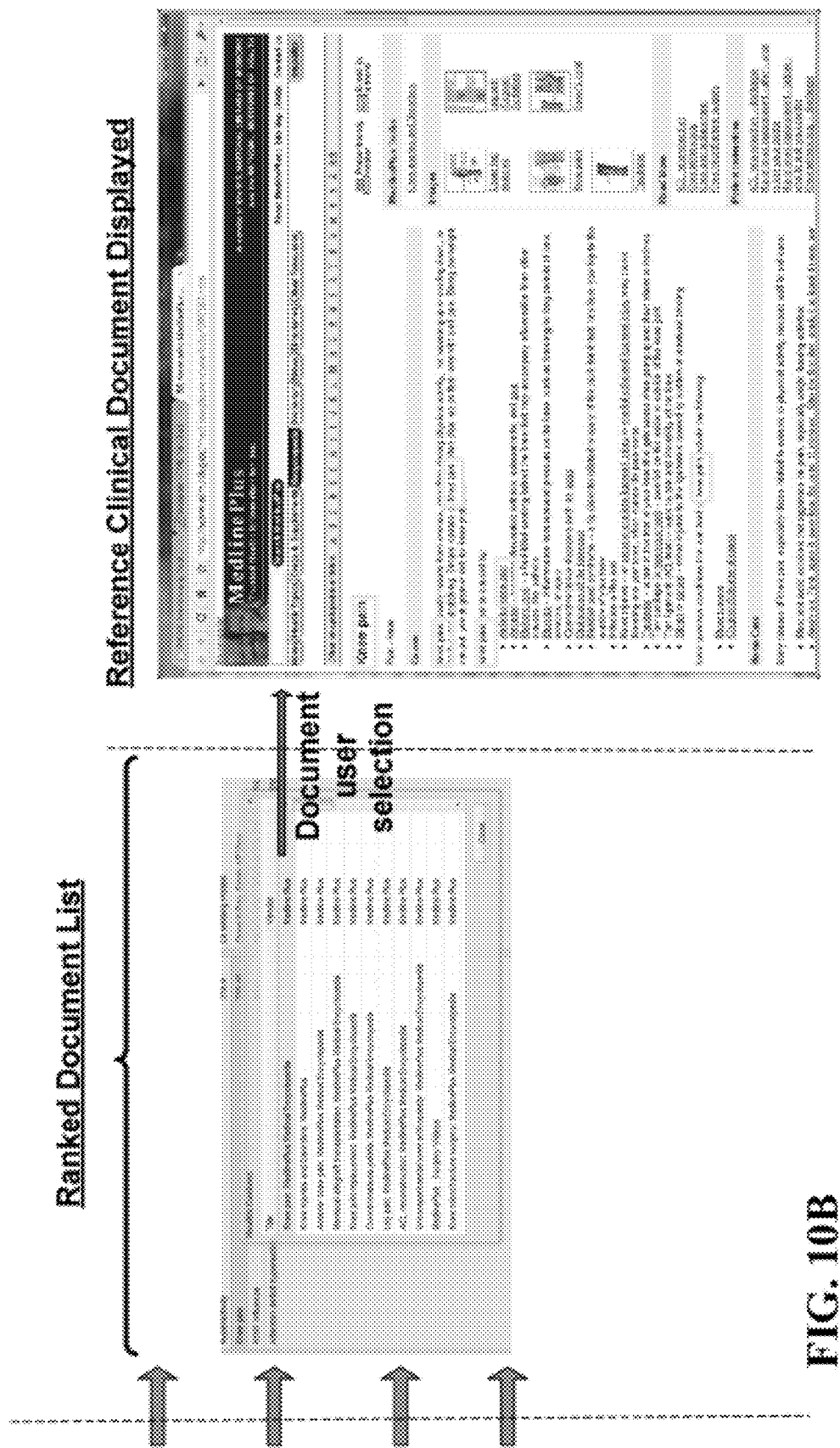

Once documents have been tagged, they may be more readily searchable and retrievable. The system may provide a method, given any medical/clinical term, to find the list of ranked documents that best describe this finding, using terminology means. In one embodiment, document retrieval may begin with, and may be carried out from, a patient face sheet or summary page for presenting information. FIG. 10 shows a search implementation illustrating document retrieval using document relevance ranking.

Document Ranking

All clinical descriptions/terms may be assigned a list of ranked documents. Such information may be a crossmap of descriptions to (ranked) documents. The process of listing documents relevant to a single description may be explained with reference to the following example:

First, an end user enters a description, in this case "Knee Arthralgia," as the search engine search value. Note that the user is entering a description that reflects that user's intent as expressed by the user's natural language choice as opposed to requiring the user to remember or look up a predetermined system code or phrase. The system then may return a series of descriptions that match or are similar to the entered description. In this case, the system may return and display a first matching description of "arthralgia of knee," which may have a parent concept "Knee Pain."

Each concept may be part of a tree or hierarchy of other concepts, i.e., each concept preferably may have, at most, one parent concept, although it also may have multiple child concepts. The "Knee Pain" concept (term) may be expanded semantically to parent/child clinical concepts, including semantic distance that will help build document ranking. For example, knee pain may be connected up to the broader concept of joint pain, which may be connected to musculoskeletal pain. Similarly, knee pain may be connected down to the more specific concepts of anterior knee pain and knee joint, painful on movement. As seen in FIG. 10, this semantic difference may be expressed in terms of discrete positive or negative values away from the concept.

The heuristic that determines the document's final ranking may be a function of description frequency and description presence factor, as well as the semantic difference or distance from other descriptions. Because multiple descriptions may relate to a shared concept, description frequency may be a compound value of all occurrences of all description variances of a shared concept, here, e.g., the concept of "Knee Pain." Relatedly, a term presence factor may reflect how "close" or "loose" a potential concept match may be. For example, the phrase "knee pain" may have a high term presence factor for the concept "knee pain," whereas the phrase "pain under kneecap" may have a lower term presence factor, reflecting the difference in terminology and inference that is required to make the match.

Once ranked, a list of documents may be compiled and displayed for the searched description. To accomplish this, the system may execute a reverse index of documents to the description and the description to document, and then compile and display a ranked index of documents. At this point, the user may select any of the resulting documents, and the selected document may be presented, preferably with all occurrences of the description highlighted. In another embodiment, occurrences of other descriptions having a shared parent concept also may be highlighted.

Documents may be modifiable in order to customize them to a specific patient, situation, etc. For example, only a portion of the document may be relevant to a diagnosis, so the user may select that portion and disregard the rest. Alternatively, the document may discuss a certain course of treatment or medication that the user may customize to reflect the patient's particular needs. Once selected, this document (modified or not) may be added to the information contained in the patient's medical record.

The process described above may be equated to assign any clinical description to a ranked list of document references, including ranking information.

As discussed above, in order to increase response time for the user, it may be beneficial to pre-compute a description-by-description or term-by-term ranked list of documents, store such information in a secondary storage, and serve that information upon request. The storage may be selected to be most efficient for speed and scalability.

In addition, the system may capture the search queries that are made and the results of what documents are selected. This information may be useful for several reasons. For example, searches where no documents are returned may be significant; they may be misspellings in the queried description or there may be no documents relevant to the description, but they also made represent new concepts for which documents already exist or new ways of expressing old concepts, i.e., they may lead to the creation of new concepts or descriptions.

Additionally, the history of what documents are or are not selected for a given search may lead to tweaking of the search results. For example, if document ranking leads to a certain document being returned as the fifth most relevant for a given search, but that document is selected twice as often as the first document, the search results may be modified to move it up higher on the list to recognize that it may be more important or useful.

Linking to Medical Records

Figure 11:
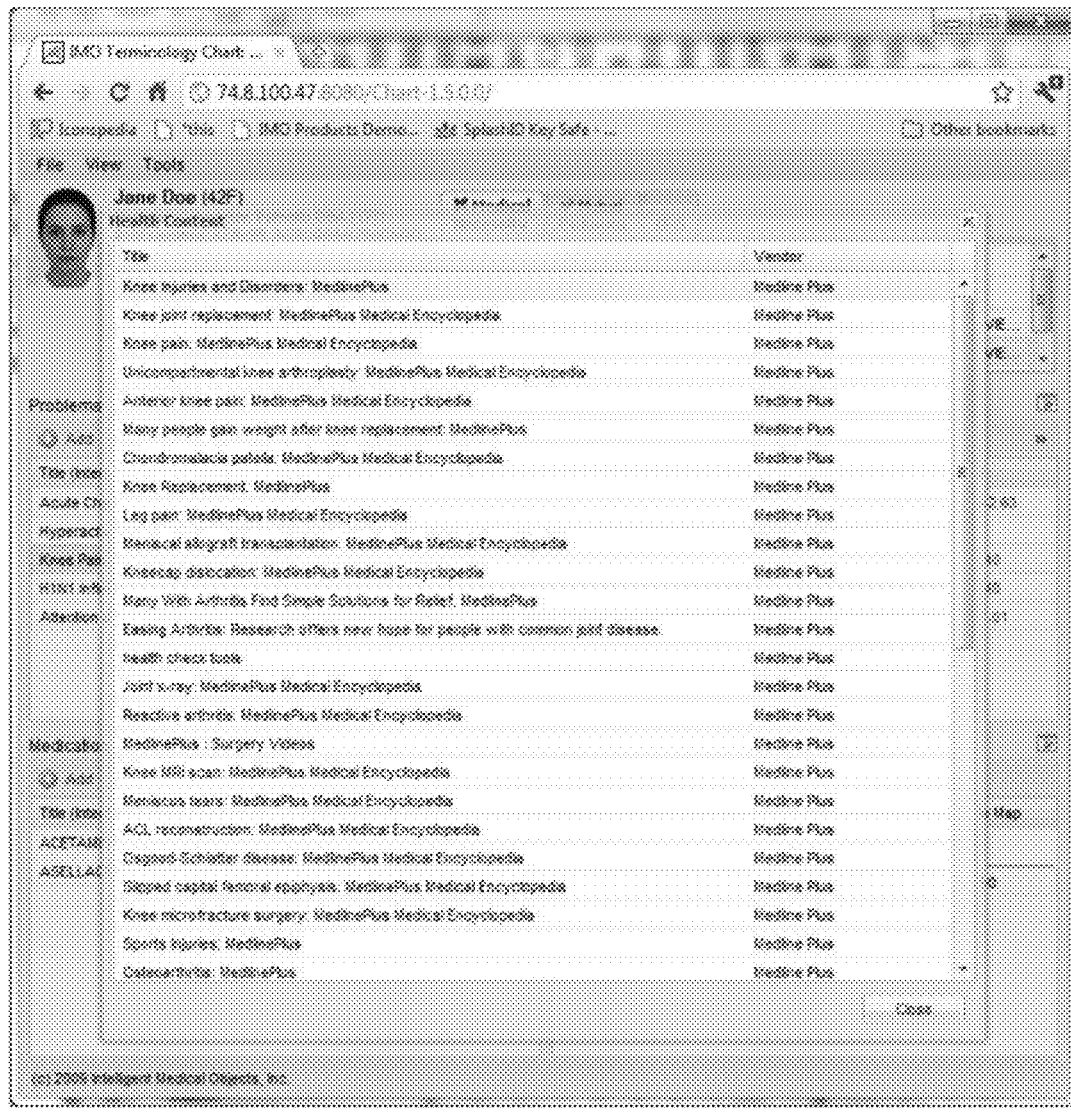
FIG. 11 is a screenshot showing a document search results window overlaid on a patient's medical record face sheet.

In another embodiment, the system may be linked to medical records software. In this manner, the user may be able to open a patient's chart and select a desired problem, procedure, medication, etc. entry. As seen in FIG. 11, the system may embed an icon in the medical record display, whereby selecting the icon may launch a modal window showing a ranked document list and content related to the selected problem, procedure, medication, etc. From there, the user may select one or more desired documents and add all or part of each document to the medical record.

Physician Search

The process described above, using clinical concepts and descriptions, may be employed in a similar manner to identity a meaningful physician related to those concepts. In this context, a physician may be considered a document. In turn, a profile of the physician may be considered a document with descriptions. As such, the system may build profile of the physician using the physician's specialties and areas of expertise as a collection of terminologies. With this profile, then same process discussed above with respect to documents may apply here.

This "physician search engine" may facilitate the ability to find the best fitting physicians—within a physician organization—using medical consumer or professional descriptions or physician specialties or expertises. This search engine addresses several issues: the ability to capture the clinical intent of the search string and to translate it into a meaningful discrete code, the ability to categorize physicians from broad categories to extremely fine expertise, and the ability to relate the codified search string to physicians—ranked by relevance—even when no apparent relationship may exist to a user.

Role of the Clinical Terminology:

Terminology is used for problem, procedure, medication, and specialty domains. In this manner, clinical concepts are translated into discrete codes, eventually mapping to SNOMED CT or another terminology at the right specificity. According to this template, physician specialty may be treated a special case—physician specialty items may represent groups of problem and procedure items, which may help set terminology bounds for the health issues addressed by a physician specialty.

In this embodiment, specialties and expertises may be distinct concepts. Specialties may be a comparatively more limited domain of concepts, whereas the list of possible expertises may include virtually any concept that can be expressed with vocabulary, i.e., expertises may be similar to descriptions, which may be comparatively limitless, as new descriptions may be added to reflect new ways of expressing a concept.

This embodiment also may differ from the document tagging embodiment discussed above in that this embodiment may include both "inclusive" and "exclusive" tags. (The document tagging embodiment also may include these, but it preferably relies primarily on inclusive tags.) For example, a physician may claim to be a specialist in pediatrics but may not want to treat older children. In this case, the physician's entry may be tagged with both an inclusive "pediatrician" tag and an exclusive "adolescents" tag. The system may recognize these tags so that the physician is included in a search for a pediatrician and preferably is not included in a search for a doctor for adolescents (or at least has his ranking in that search result decreased to indicate that he is a less precise match).

Physician Specialty itself may be considered a terminology domain: Physician Specialty items may have maps to SNOMED CT, Physician Taxonomy and MeSH (Medical Subject Headings) terminology.

Figure 12:
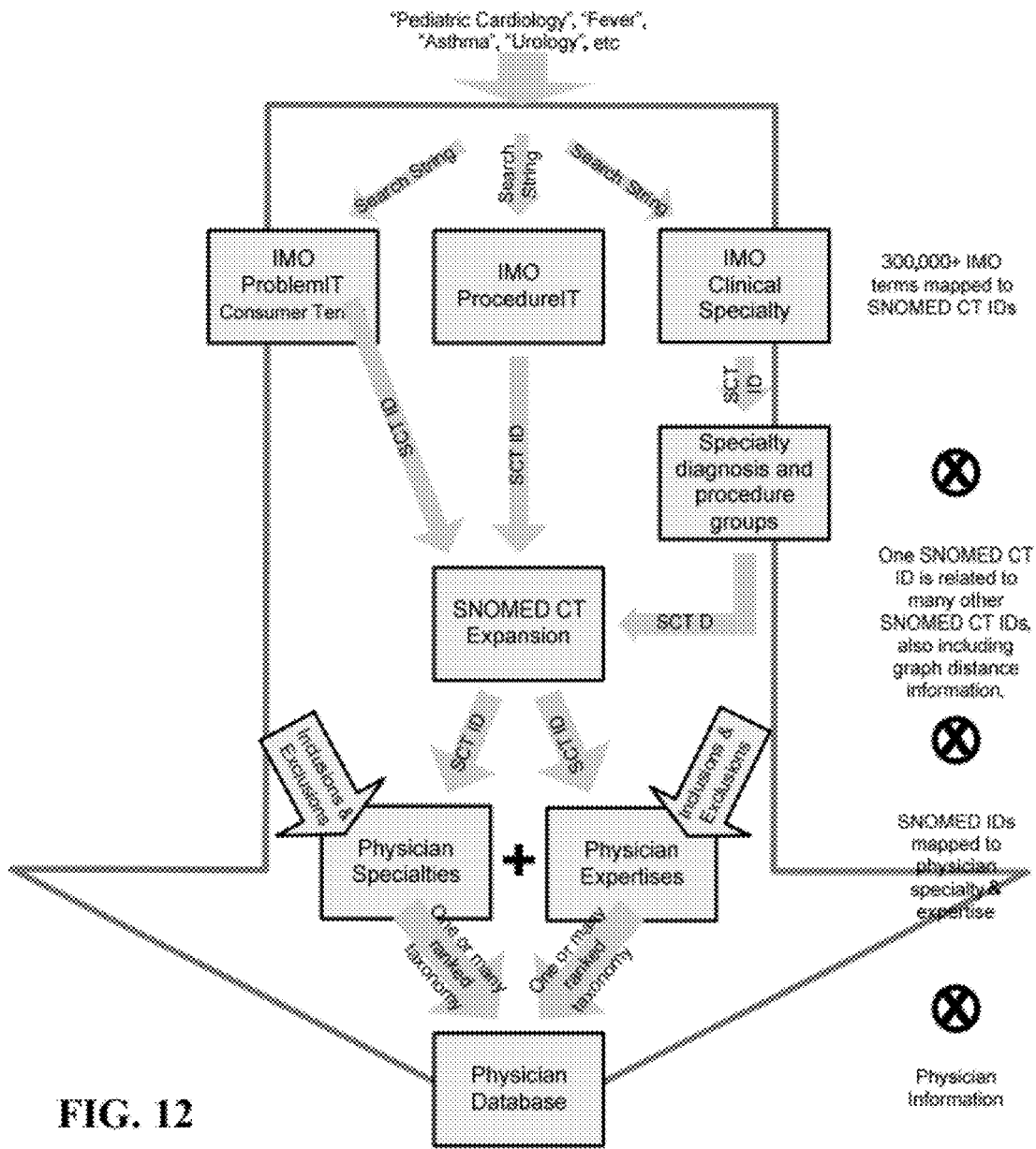
FIG. 12 illustrates search engine components for carrying out the process to locate a desired health care provider.

FIG. 12 may describe the anatomy of the physician search engine components, illustrating how different terminologies feed 'codes' toward finding a physician. In this embodiment, physicians are categorized, i.e., specialty item(s) are assigned to each physician as broad categorizations, and expertise items (health issues/problem and procedures) are assigned as fine-grained categorizations.

FIG. 12 further includes components relating codifying information and expanding information, while setting specific information relevance. This process may be simplified as a single, very large, terminology-to-physician crossmap. For example, for 1,000 physicians and over 300,000 clinical terms, cross products result in $10^{15}$ to $10^{20}$ combinations. Such information magnitude may not be well-handled by current commercial databases, both for response time and scalability. As such, this cross-map may be hosted on an in-memory database. Such hosting may dramatically improve response time, e.g., to below about one millisecond. Similarly, concurrent access may show improved results, such as not showing significant degradation below about 80 concurrent requests.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A computer-implemented process for tagging content with one or more descriptions pertaining to that content, comprising:

populating a database with a plurality of concepts; and
populating a database with a plurality of descriptions;
wherein each concept resides hierarchically under a domain and further is unique within a given domain,
wherein each domain has its own hierarchical structure;
wherein at least one of said each domain is a category selected from the group including but not limited to a problem, a procedure, a diagnosis, a medication, and an allergy;
wherein each description is unique within a given domain;
wherein each description is an alternative way to express an associated concept,
wherein said descriptions have a many-to-one relationship with each of said plurality of concepts, and
wherein each description has a presence factor indicative of a strength of the relationship between it and its associated concept, the presence factor also indicative of a physician's intent when the description is generally used by physicians;
relating each description to a respective concept such that each description has a concept, wherein each concept has at least one description;
reviewing said content for a satisfactory description, said reviewing step including identifying portions of the content that match concepts by determining if each of a plurality of content portions relates to one or more of said descriptions associated with a given concept;

creating a description tag for each portion of the content that are identified from said satisfactory description match, said description tag including a reference to a location of said identified portion within said content, said description tags being stored in a format which can be searched by search tools;

generating, in response to a query, a rank for said content using at least one of said description tags and said related concept, said ranking based at least on the presence factor for the descriptions of description tags applied to the content; and displaying the content in a list based on the content's rank.

2. The process according to claim 1, wherein one of said descriptions comprises a plurality of words, and where in the reviewing said content step comprises:

identifying a textual match between a portion of said content and said description; and determining a distance between words in said content, said words corresponding to said description words, where the rank is based on the determined distance.

3. The process according to claim 1, wherein said content relates to a medical professional.

4. The process according to claim 1, wherein said content is an electronic document.

5. The process according to claim 4, further comprising:
associating said tag for said satisfactory description match to a concept corresponding to said description.

6. The process according to claim 5, further comprising:
calculating a concept frequency occurrence for the electronic document;
wherein the rank also is based on the concept frequency occurrence for the electronic document.

7. The process according to claim 4, further comprising:
displaying said electronic document and a visual indicator of said tag, wherein said visual indicator is positioned within said electronic document proximate said match.

8. The process according to claim 1, further comprising:
receiving a query for content;
comparing said query with at least one of said plurality of descriptions;
returning a selectable list of results, said results containing said satisfactory description match.

9. A process for tagging and retrieving electronic documents, comprising:
populating a database with a plurality of descriptions; and
populating a database with a plurality of concepts;
wherein each concept resides hierarchically under a domain and further is unique within a given domain,
wherein each domain has its own hierarchical structure;
wherein at least one of said each domain is a category selected from the group including but not limited to a problem, a procedure, a diagnosis, a medication, and an allergy;
wherein each description also is unique within a given domain;
wherein a description is an alternative way to express an associated concept,
wherein said descriptions have a many-to-one relationship with each of said plurality of concepts, and
wherein each description has a presence factor indicative of a strength of the relationship between it and its associated concept, the presence factor also indicative of a physician's intent when the description is generally used by physicians;

relating each description to a respective concept such that each description has a concept, wherein each concept has at least one description;

reviewing a document for a satisfactory description, the reviewing step including identifying portions of the document that match concepts by determining if each of a plurality of portions of the document relates to one or more of said descriptions associated with a given concept;

applying a plurality of description tags to the document in a plurality of locations within said document that correspond to locations of the portions of the document that relate to descriptions associated with respective concepts, said description tags being stored in a format which can be searched by search tools;

creating a link between said document and concepts related to said document, wherein said related concepts are related to said plurality of description tags;

ranking, in response to a query, said document against other documents using at least one of said description tags and said related concept, said ranking based at least on the presence factor for the descriptions of description tags applied to the document; and displaying a list of documents ordered by document rank.

10. The process according to claim 9, wherein said documents include text readable by a computer.

11. The process according to claim 9, further comprising:
recording a history of documents selected from among said list; and
reordering said list in view of said history.

12. The process according to claim 9, wherein said plurality of concepts are interrelated in a tree or graph structure.

13. The process according to claim 9, further comprising:
displaying a selected document with said applied description tags, including visually distinguishing between description tags relating to a first domain and description tags relating to a second domain.

14. The process according to claim 9, further comprising:
recognizing improperly applied description tags.

15. A system for automatically tagging and manually editing electronic content, comprising:
one or more computers, comprising one or more processors, storing:
a plurality of concepts stored in a database, wherein each concept is hierarchically under a domain and is unique within the domain, wherein each domain has its own hierarchical structure wherein each domain has its own hierarchical structure; wherein at least one of said each domain is a category selected from the group including but not limited to a problem, a procedure, a diagnosis, a medication, and an allergy;
a plurality of descriptions stored in a database, wherein a description is an alternative way to express a concept, wherein each description also is unique within a given domain, wherein each description relates to a respective concept, wherein said descriptions have a many-to-one relationship with each of said plurality of concepts, and wherein each description has a presence factor indicative of a strength of the relationship between it and its related concept, the presence factor also indicative of a physician's intent when the description is generally used by physicians;
a plurality of items of electronic content, where each electronic content item includes portions and each portion is reviewed to determine if said portion matches one or more of said concepts by determining if said portion relates to one or more of said plurality of descriptions associated with a given concept;

a plurality of content tags representing locations and identifications of portions of the electronic content that relate to one or more of said plurality of descriptions, wherein said content tags have a many-to-many relationship with said plurality of descriptions, wherein said electronic content items have a many-to-many relationship with said plurality of content tags;

a plurality of rankings for the electronic content, the rankings generated in response to a query and based at least on the presence factor for the descriptions of content tags applied to the electronic content; and a list of the electronic content sorted by the plurality of rankings; and a database including a table for storing information relating to said electronic content.

16. The system according to claim 15, wherein said plurality of concepts are interrelated in a tree or graph structure.

17. The system according to claim 16, where the one or more computers includes instructions stored on a non-transient tangible medium that calculate a semantic distance between at least two concepts based on the tree or graph structure and where the rankings for the electronic content also are based on the semantic distance between the at least two concepts.

18. The system according to claim 15, wherein said electronic content is a plurality of electronic documents.

19. The system according to claim 17, where the one or more computers includes instructions stored on a non-transient tangible medium that calculate a concept frequency occurrence for each electronic document, where the rank also is based on the concept frequency occurrence for the electronic document.

20. The system according to claim 15, wherein said electronic content relates to a medical professional.

21. The system according to claim 15, further comprising:
a user interface configured to view and modify at least one of: said plurality of concepts, said plurality of descriptions, said plurality of content tags, and said plurality of items of electronic content.

* * * * *